United States Patent Office 3,297,479
Patented Jan. 10, 1967

3,297,479
INSULATED COPPER ARTICLES CONTACTING ISOTACTIC POLYPROPYLENE CONTAINING A THIODIALKANOIC ACID DIESTER AND A POLYNUCLEAR PHENOLIC ANTIOXIDANT
Robin Henry Burgess, Market Drayton, and Vivien Griffiths, Welwyn Garden City, England, assignors to Imperial Chemical Industries Limited, London, England, a corporation of Great Britain
No Drawing. Filed Dec. 23, 1960, Ser. No. 77,811
Claims priority, application Great Britain Dec. 31, 1959
10 Claims. (Cl. 117—232)

This invention relates to articles comprising copper and a polypropylene composition in contact therewith and particularly to copper articles insulated with isotactic polypropylene compositions.

Isotactic polypropylene (by isotactic polypropylene we mean a crystallisable polypropylene at least 75% of which is insoluble in heptane) is a material with excellent mechanical and electrical properties which is easily shaped into strips, ribbons and coatings by normal processes of the plastics industry such as extrusion and injection moulding. It is, therefore, highly desirable that this polymer should be available for use in, for example, electrical applications such as cable insulation, condensers, or components having copper inserts.

It is well known that it is desirable to incorporate antioxidants into polypropylene. It has generally been found, however, that it is rapidly degraded and become brittle when it is in the presence of copper, particularly when it is subjected to elevated temperatures, even when it has admixed with it the best antioxidants known in the art.

Furthermore, most of the known antioxidants cause staining of polypropylene particularly after polypropylene compositions containing them have been subjected to heat and light ageing.

Certain phenolic compounds have been proposed as non-staining antioxidants, but it has generally been found that they are less effective than the aromatic amine antioxidants, and these latter are, therefore, frequently preferred in spite of the drawbacks usually associated with their staining character.

It is an object of the present invention to provide articles comprising copper in contact with a polymeric composition comprising isotactic polypropylene which is outstandingly resistant to embrittlement and in preferred embodiments shows a remarkably low tendency to staining.

Copending application Serial No. 44,278, now abandoned describes a class of phenolic compounds containing at least two phenolic nuclei which show an astonishing synergism with certain thio-compounds which are diesters or hydrocarbon-substituted diamides of thiodialkanoic acids, in that a mixture of a phenolic compound chosen from the said class with one of the said thio-compounds protects isotactic polypropylene against embrittlement on exposure to elevated temperatures to a far greater degree than could have been predicted from the performance of the phenolic compound or the thio-compound alone. We have now found that within this broad disclosure there are certain classes of phenolic compound which are outstandingly effective in preventing embrittlement of isotactic polypropylene which is in close contact with copper.

At the same time we have found that within the same broad disclosure there are other well defined classes of phenolic compound which are of scarcely any value for the purposes of this invention.

Thus the compounds of this invention are capable of protecting a polypropylene composition against embrittlement in the presence of copper for 100 hours or more, in the better cases for over 200 or even over 500 hours, and in the best cases for even as much as 600 hours when polypropylene coated sheets are held in an air oven at 140° C. as will be seen hereinafter.

The compounds which fall outside this invention, but are within the scope of copending application Serial No. 44,278, now abandoned are characterised by an embrittlement time measured under the same conditions of less than 100 hours, more usually only 25 or 50 hours, and sometimes even only 10 hours, although in the absence of copper they are exceptionally good stabilisers.

According to the present invention we now provide articles comprising copper in contact with a polymeric composition comprising isotactic polypropylene and a stabiliser composition comprising a diester of a thiodialkanoic acid selected from the class consisting of β-thiodipropionic and thiodibutyric acids and of an alcohol containing from ten to twenty carbon atoms and a phenolic compound selected from compounds having the formula

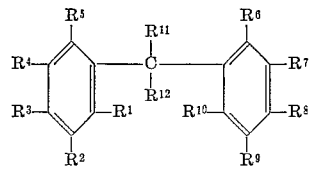

and compounds having the formula

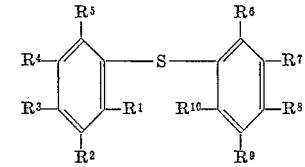

in which $R^3$ and $R^8$ are hydroxyl groups, $R^2$ and $R^7$ are alkyl groups, the remaining nuclear substituents being selected from the class consisting of alkyl groups, alkoxyl groups and hydrogen atoms, and in which $R^{11}$ and $R^{12}$ together contain at least three carbon atoms and are selected from the class consisting of alkyl groups, hydroxy-aryl groups, hydrocarbon and oxacycloalkyl groups having a hydroxyaryl group as a substituent, and hydrogen atoms.

In one preferred form of the invention the said stabiliser composition comprises a diester of thiodialkanoic acid selected from the class consisting of β-thiodipropionic and thiodibutyric acids and of an alcohol containing from 10 to 20 carbon atoms and a phenolic compound having the formula

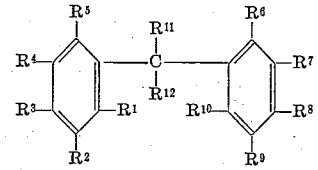

in which $R^3$ and $R^8$ are hydroxyl groups and $R^2$ and $R^7$ are alkyl groups, the remaining nuclear substituents being hydrocarbon groups or hydrogen atoms, and in which the hydrocarbon substituents on each phenolic nucleus together contain not more than twelve carbon atoms, and in which $R^{11}$ and $R^{12}$ are selected from the class consisting of alkyl groups and hydrogen atoms, $R^{11}$ and $R^{12}$ together containing from six to twenty carbon atoms.

Compositions in which $R^{11}$ and $R^{12}$ together contain from six to nine carbon atoms are very effective and are preferred for reasons of economy and for their ease of preparation.

In another preferred form of the invention the said stabiliser composition comprises a diester of a thiodialkanoic acid selected from the class consisting of β-thiodipropionic and thiodibutyric acids and of an alcohol containing from 10 to 20 carbon atoms and a phenolic compound which is the product of reaction of at least two molecules of a phenol substituted by an alkyl group in an ortho position and having a para position free and one molecule of an unsaturated aldehyde or ketone.

In this latter form we often find that more than two molecules of the phenol are combined with one molecule of the unsaturated aldehyde or ketone, the phenol molecules in excess of two being added across the double bond or bonds of the unsaturated aldehyde or ketone. Condensates of 3-methyl-6-tertiary butyl phenol with acrolein, crotonaldehyde, and cinnamaldehyde and of 2,6-xylenol with crotonaldehyde have been analyzed and found to have this structure. According as the unsaturated aldehyde or ketone is monomeric (e.g. crotonaldehyde, cinnamaldehyde) or, as in the case, for instance, crotonaldehyde dimer and methacrolein dimer, is a heterocyclic dimer, the phenolic compound will contain respectively hydroxyaryl-substituted hydrocarbon groups or hydroxyaryl-substituted oxacycloalkyl groups.

Our copending application Serial No. 44,547, now U.S. Patent No. 3,196,185 issued July 7, 1965, describes and claims certain of these phenolic compounds as new materials, and also a process for their production.

We find that those condensates in which three or more molecules of a phenol are combined with one molecule of an unsaturated aldehyde or ketone are particularly effective in the compositions of our invention. Accordingly, our invention provides copper articles in contact with a polymeric composition comprising isotactic polypropylene and a stabilizer composition comprising a diester of a thiodialkanoic acid selected from the class consisting of β-thiodipropionic and thiodibutyric acids and of an alcohol containing from ten to twenty carbon atoms and a phenolic compound of the formula set out on page 5 in which $R^3$ and $R^8$ are hydroxyl groups, and $R^2$ and $R^7$ are alkyl groups, the remaining nuclear substituents being selected from the class consisting of alkyl groups and hydrogen atoms, and in which $R^{11}$ is selected from the class consisting of hydroxyaryl groups, alkyl, aralkyl and oxacycloalkyl groups having as a substituent a hydroxyaryl group, alkyl groups, and hydrogen atoms, and $R^{12}$ is selected from the class consisting of hydroxyaryl groups and alkyl, aralkyl and oxacycloalkyl groups having as a substitutent a hydroxyaryl group.

We prefer that the said hydroxyaryl groups are p-hydroxy mononuclear aryl groups.

We prefer that the penolic nuclei and any hydoxyaryl groups $R^{11}$ and $R^{12}$ or any hydroxyaryl residues in groups $R^{11}$ and $R^{12}$ should be substituted, and the substituents in the said hydroxyaryl groups or residues are very conveniently the same as in the said phenolic nuclei.

For reasons of convenience and economy, and because of the lower level of staining thus obtained, we prefer that the substituents are hydrocarbon groups, particularly alkyl groups. Bulky alkyl groups, e.g. tertiary butyl and $\alpha,\alpha,\gamma,\gamma$-tetramethyl butyl groups at positions $R^2$ and $R^7$ are especially suitable. However, other hydrocarbon groups, for example α-phenyl ethyl, α-phenyl-isopropyl, or 1-methylcyclohexyl groups may also be present, and may if desired be introduced into a phenolic compound after its formation e.g. by the process of British specification No. 698,463.

We prefer that the substituents do not together contribute more than twelve carbon atoms to each phenolic nucleus, as phenolic compounds having more than twelve carbon atoms attached to each nucleus are not more useful but merely more expensive.

If in the phenolic compounds $R^3$ and $R^8$ are hydroxyl and $R^2$ and $R^7$ are alkyl, particularly effective compositions are obtained.

The superiority of our isotactic polypropylene compositions as coating materials for copper articles is clearly borne out by the results listed in the tables of polypropylene embrittlement times. Thus the figures show that every phenolic compound derived from a para-substituted phenol or in which $R^{11}$ is an aryl group failed when tested in the presence of copper after at most 70 hours. Phenolic compounds in which the phenolic nuclei each contained more than one hydroxyl group were little more effective than these latter compounds.

In contrast, phenolic compounds in which $R^3$ and $R^8$ were hydroxyl groups and $R^{11}$ was not aryl and in which there were no further hydroxyl substituents lasted several hundred hours.

If $R^{11}$ and $R^{12}$ are selected from alkyl groups, hydroxyaryl groups, hydroxyaryl-substituted hydrocarbon groups, hydroxyaryl-substituted oxacycloalkyl groups and hydrogen atoms and the phenolic nuclei as well as any hydroxyaryl groups or residues are substituted by either a large group at $R^2$ and $R^7$ for example a tertiary butyl or $\alpha,\alpha,\gamma,\gamma$-tetramethyl butyl group with if desired a smaller group at $R^5$ and $R^{10}$, or by alkyl groups at $R^2$, $R^4$, $R^7$ and $R^9$ compositions are obtained which are extremely effective in the presence of copper and have a very low tendency to stain.

We find that the products of reaction of at least two molecules of a 2,6 or a 3,6-dialkyl phenol with one molecule of acrolein, methacrolein, crotonaldehyde, cinnamaldehyde or 1-methyl cyclohexene-4-al are outstanding in this regard.

The phenolic compounds of the stabiliser compositions of this invention may, for example, be prepared (a) by condensing an aldehyde or ketone having an organic group or groups containing at least three carbon atoms attached to its carbonyl group with a phenol under conditions in which one molecule of aldehyde or ketone condenses with two molecules of phenol, or (b) by condensing an unsaturated aldehyde or ketone with a phenol under conditions such that one molecule of aldehyde or ketone condenses with at least two molecules of phenol or (c) by condensing one molecule of sulphur dichloride with two molecules of a phenol.

Conditions for condensation (a) are in general well known in the art, and are normally effected by condensing at a temperature and for a time depending on the reactivity of the constituents in the presence of a strong acid, e.g. in the presence of hydrochloric acid, which may be provided either as a solution or as a gas. (See "The Chemistry of Phenolic Resins" by Robert W. Martin, published by John Wiley and Sons Inc. in 1956, particularly Chapter 3.)

It is often desirable to use a solvent for the phenol and the aldehyde or ketone, preferably a solvent in which the product of reaction is only sparingly soluble. It is particularly desirable, to use a solvent if the phenol, aldehyde or ketone, and acid catalyst do not form a homogeneous mixture. See for example U.S. Patent 2,831,897 and our copending U.S. patent application Serial No. 44,278, now abandoned, reference to which may be made (as also to Niederl and McCoy, JACS 63, p. 1731 (1941), McGreal JACS 61, p. 345 (1939), and copending U.S. application Serial No. 44,547, now U.S. Patent No. 3,196,185 issued July 7, 1965), for carrying out of condensation (b).

For condensation (c) see for example British specfication No. 796,285.

Whilst the preparation of the phenolic compounds forms no part of what we claim it should be pointed out that α,β unsaturated aldehydes and ketones having alkyl substituents on both the α and β carbon atoms, for example 2-ethyl-hex-2-enal and 2-ethyl crotonaldehyde are either unstable in the presence of hydrochloric acid and break down to give simpler products or else react so slowly that yields are very unsatisfactory. Thus from 2-ethyl-hex-2-enal the reaction products isolated are mainly those derived from butyraldehyde. These, however, are more conveniently prepared directly.

In such cases acid catalysis cannot be relied upon, and other methods of effecting the condensation must be attempted.

It should also be pointed out that some of our phenolic compounds for example, the condensate of crotonaldehyde and 3-methyl-6-tertiary butyl phenol crystallise readily with solvent of crystallisation; this sometimes makes analysis difficult. In the case of the condensate of acrolein and 2,6-xylenol, analysis shows that hydrogen chloride has been added across the double bond of the acrolein, and that under the conditions of the reaction as described in our aforesaid copending application a molecule of xylenol does not add across the double bond. As will be seen from the first of the unnumbered experiments in Table 2, little useful protection is obtained by using this compound, which is outside the scope of our invention.

In some cases a crystalline compound is obtained which is the desired product. In most cases, however, a gum or glass is obtained which is then subjected to vacuum distillation, the residue and occasionally the less volatile fractions being taken for antioxidant testing. In the condensation of 3-methyl-6-tertiary butyl phenol with methyl vinyl ketone, for example, a crystalline product is obtained as a distillate which is of only rather low activity although the residual gum is of high activity. The composition of the crystalline product in this case corresponds to a 1:1 condensation of the phenol with the ketone and probably has the structure

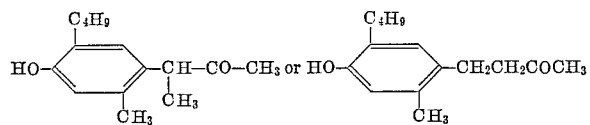

In preparing the phenolic compounds used in this invention, the distillations are not necessarily carried out under precisely the same conditions in every case, but as a convenient generalisation it may be said that it is preferred that the boiling point of the phenolic compound is not less than about 200° C. at a pressure of 1 mm. of mercury. Phenolic compounds having a boiling point appreciably less than this are too volatile to be useful in compositions which are required to withstand very high temperatures on processing or in subsequent use.

A particularly convenient way of obtaining phenolic compounds of high molecular weight and, therefore, low volatility is to react three or more molecules of a substituted phenol, particularly a 2,6 or a 3,6 dialkyl phenol with one molecule of an unsaturated aldehyde or ketone. In this way a phenolic compound is obtained in which at least one of $R^{11}$ and $R^{12}$ is a group containing at least nine carbon atoms.

In the case of the condensate from 3-methyl-6-tertiary butyl phenol and crotonaldehyde, for example, $R^{11}$ contains fourteen carbon atoms. To introduce such a large group directly would be a more tedious procedure, and the condensates from unsaturated aldehydes and ketones have the advantage that an extra phenolic group is provided.

Whilst we have described convenient general methods for the preparation of our phenolic compounds, and whilst copending application Serial No. 44,278, now abandoned, gives further details of several indivdual preparations, some alternative methods will be immediately apparent to those skilled in the art, for example, the use of mercapto-compounds or certain metal halides or ion-exchange resins as catalysts, or the use of an aldehyde or ketone having a hydroxyaryl-substituted hydrocarbon group attached to its carbonyl group in place of an unsaturated aldehyde or ketone.

Suitable phenols having a para position free, are for instance, phenol itself, guaiacol, o-phenyl phenol, o-α-phenyl ethyl phenol, o-α-methylcyclohexyl phenol, o-(α-phenyl isopropyl) phenol and especially the o-alkyl phenos for instance, o-cresol, o-ethyl phenol, o-propyl and isopropyl phenols, o-butyl phenols, particularly o-tertiary butyl phenol, o-amyl phenols, o-hexyl phenols, o-heptyl phenols, o-octyl phenols, particularly tertiary octyl phenol, i.e., α,α,γ,γ-tetramethyl butyl phenol, o-nonyl phenols, o-decyl phenols, o-undecyl phenols, o-dodecyl phenols, phenols substituted in an ortho-position as above and also in a second ortho or in the opposite meta position, for instance 2,6-xylenol, 2-methyl-6-tertiary butyl phenol, 3-methyl-6-tertiary butyl phenol, 3-methyl-6-tertiary octyl phenol, 3-methoxy-6-tertiary butyl phenol, 3-ethyl-6-tertiary octyl phenol, 3-methyl-6-nonyl phenol, 3-methyl-6-α-methylcyclohexyl phenol, 3-ethyl-6-α-phenyl ethyl phenol, 3-methyl-6-(α-phenyl isopropyl) phenol, and 3-methoxy-6-phenyl phenol. Phenols having two or more hydroxyl groups, for example, catechol, hydroquinone, resorcinol and pyrogallol are also relatively ineffective.

In the above list of phenols the higher alkyl phenols such as heptyl, octyl, nonyl, decyl, undecyl and dodecyl phenols are for the most part available as technical-grade commercial products in which the alkyl groups are formed by the dimerisation, trimerisation and co-dimerisation of for example, propylene, isobutylene and pentenes.

Thus propylene trimer is a source of nonyl groups, and isobutylene dimer of octyl groups.

Suitable aldehydes and ketones are for example p-hydroxy benzaldehyde, 3,5-dimethyl-4-hydroxy benzaldehyde, 2-methyl-4-hydroxy-5-tertiary butyl acetophenone, α- and β-(2-methyl-4-hydroxy-5-tertiary butyl phenyl) propiophenones, butyraldehyde, methyl ethyl ketone, the various pentanals, e.g., valeric aldehyde, pentanones, e.g., methyl propyl ketone, hexanals, e.g., n-hexanal, hexanones, e.g., methyl isobutyl ketones, heptanals for instance 3-methyl hexanal, heptanones, e.g., heptanone-3, octanals, e.g., commercial isooctanal, nonanals, e.g., commercial nonanal, diisobutyl ketone, decanals, e.g., commercial decanal, undecanals, methyl undecyl ketone, dodecanals, acrolein, crotonaldehyde, methacrolein, methyl vinyl ketone, pent-2-enal, mesityl oxide, cyclohexenone, methylcyclohexenone, 1-methyl-cyclohexene-4-al, methacrolein dimer, crotonaldehyde dimer, cinnamaldehyde, benzalacetone, citral, 3-tertiary-butyl-4-hydroxy-cinnamaldehyde, dibenzalacetone. Other aldehydes and ketones may be used but for reasons of economy and for the greatest ease of preparation of the phenolic compounds it is preferred to use aldehydes and ketones containing not more than about twenty carbon atoms.

Of these aldehydes and ketones, the commercial octanals, nonanals, decanals, undecanals and dodecanals are technical grade products derived from the dimerisation, trimerisation or mixed dimerisation of, for example, propylene, butenes, and pentenes, the olefines thus obtained being then subjected to the Oxo process.

Whilst most of our phenolic compounds, which we prefer, are excellent in their resistance to standing and are, therefore, suitable for use in light coloured goods, there are some which stain but nevertheless give most valuable stabiliser compositions, for example, the p-hydroxy benzaldehyde/3-methyl-6-tertiary butyl phenol condensate. Such phenolic compounds are, of course, perfectly satisfactory for use in dark-coloured goods, for instance in carbon black-filled compositions.

Whilst we find that useful stabilised compositions may be obtained with widely varied ratios of staid diester of a thiodialkanoic acid to said phenolic compound, and whilst our invention is in no way limited to particular ratios of these ingredients, we find that particularly effective ratios of these ingredients are when there are from 1 to 10 hydroxyl groups provided to the composition by the phenolic compound to each sulphur atom provided to the composition by said diester.

The content of these components in these compositions may also be varied over very wide limits. It is seldom necessary to use more than 5% of the phenolic compound together with the diester and, in general, between 0.2 and 1% for instance 0.5% of the phenolic compound together with an appropriate amount of the diester is sufficient. For compositions which are to be subjected to vigorous conditions of oxidation during their processing or during their later use larger amounts of these additives may be used.

Any diester of β-thiodipropionic or thiodibutyric acid and of an alcohol containing from ten to twenty carbon atoms may be used in the compositions of this invention. We find, however, that particularly satisfactory compositions are obtained when the diesters are diesters of aliphatic alcohols, for example, lauryl, cetyl and stearyl alcohols.

The compositions of this invention may be prepared in a variety of ways depending upon the manner in which the polymeric material is obtained and the amount of stabilising material to be incorporated in the compositions. Larger quantities of the stabilising components may be mixed with isotactic polypropylene by any of the mastication processes. A satisfactory method for mixing the stabilizing ingredients with isotactic polypropylene is to add a solution of the components to polypropylene powder and then to remove the solvent for the stabilising components by evaporation.

The compositions of this invention may also contain other stabilisers such as materials which absorb ultra violet light. They may also contain further ancillary ingredients such as processing aids, for example, the soaps of calcium and zinc, and also such materials as pigments, dyes and fillers. Thus carbon black may be incorporated either as an absorber of ultra violet light or as a pigment.

The following experimental details illustrate our invention. It will be understood however that our invention is in no way limited by these details.

Condensation products were made from various phenols with various aldehydes and ketones as described in copending application Serial No. 44,278, now abandoned.

*Example 1*

Isotactic polypropylene of melt flow index 5 (as measured by the A.S.T.M. method modified by using a 10 kg. weight instead of that specified for causing extrusion) was mixed on open rolls at 165° C. with thiodialkanoic acid derivatives and various phenol condensates, as set out in the following table. Thin sheets about 1/50 of an inch thick were prepared by moulding at 190° C. from each of the compositions obtained. Samples were pressed on to copper sheets of thickness 1/200 of an inch to give a coating of thickness 1/50 of an inch. These sheets were held in an air oven at 140° C. until they were found to be brittle when handled. The results of these tests were as follows:

TABLE 1
[(For abbreviations see after Table 2)—Comparison experiments are not numbered]

| Expt. | Thio-Compound | Percent | Phenolic Compound | Percent | 140° brittle time (Hrs.) Without Copper | 140° brittle time (Hrs.) With Copper | Staining On Milling | Staining In U.V. |
|---|---|---|---|---|---|---|---|---|
| 1 | Dilauryl thiodipropionate | 0.5 | 3M6B phenol/decanaldehyde | 0.5 | 860 | 410 | Nil | Good. |
| 2 | do | 0.5 | 3M6O phenol/nonaldehyde | 0.5 | 525 | 455 | Nil | Do. |
| 2 | do | 0.5 | p.Octyl phenol/nonaldehyde | 0.5 | 500 | 50 | Nil | Do. |
| 2 | do | 0.5 | 2M6M/benzaldehyde | 0.5 | 530 | 70 | Orange | |
| 3 | do | 0.5 | 3M6B/p.hydroxy benzaldehyde | 0.5 | 750 | 550 | Grey | Bad. |
| 3 | do | 0.5 | 3M6B/acetophenone | 0.5 | 530 | 25 | V. pale brown | Fair. |
| 3 | do | 0.5 | 2O4OMe/methyl cyclohexanone | 0.5 | 380 | 50 | Pale brown | Good. |
| 4 | do | 0.5 | 3M6B/nonaldehyde | 0.5 | 815 | 240 | Nil | Do. |

TABLE 2
[(For abbreviations see immediately following this table)—Comparison experiments are not numbered]

| Expt. | Thi-Compound | Percent | Phenolic Compound | Percent | 140° brittle time (Hrs.) Without Copper | 140° brittle time (Hrs.) With Copper | Staining On Milling | Staining In U.V. |
|---|---|---|---|---|---|---|---|---|
| 1 | Dilauryl thiodipropionate | 0.5 | 3M6O phenol/crotonaldehyde | 0.5 | 880 | 505 | Nil | Good. |
| 1 | do | 0.5 | 2.6 dimethyl phenol/acrolein | 0.5 | 530 | 100 | Nil | Do. |
| 2 | do | 0.5 | 3M6B/acrolein | 0.5 | 765 | 385 | Nil | Do. |
| 2 | do | 0.5 | 4-t. butyl phenol/methacrolein | 0.5 | 360 | 10 | Nil | Do. |
| 3 | do | 0.5 | 3M6B/methacrolein | 0.5 | 575 | 385 | Nil | Do. |
| 4 | do | 0.5 | 2.6 dimethyl phenol/crotonaldehyde | 0.5 | 675 | 410 | Nil | Fair. |
| 4 | do | 0.5 | Catechol/crotonaldehyde | 0.5 | 450 | 50 | Black | |
| 5 | do | 0.5 | Guaiacol/crotonaldehyde | 0.5 | 670 | 120 | Brown | |
| 5 | do | 0.5 | p-Octyl phenol/crotonaldehyde | 0.5 | 670 | 25 | Pale yellow | Good. |
| 6 | do | 0.5 | 3M6B/cinnamaldehyde | 0.5 | 795 | 675 | Pale pink | Do. |
| 7 | do | 0.5 | 2.6 dimethyl phenol/citral | 0.5 | 670 | 145 | Pale yellow | Do. |
| 8 | do | 0.5 | 3M6B/1-methyl cyclohexene 4-al | 0.5 | 600/625 | 600 | Nil | Do. |
| 8 | do | 0.5 | Catechol/dibenzal acetone | 0.5 | 720 | 100 | Brown | |
| 9 | do | 0.5 | 3M6B/mesityl oxide | 0.5 | 625 | 170 | Pale brown | Good. |
| 9 | do | 0.5 | p.Octyl phenol/cyclohexenone | 0.5 | 335/695 | 30 | Nil | Do. |
| 10 | Distearyl thiodipropionate | 0.5 | 3M6B/crotonaldehyde | 0.5 | 1730 | 840 | Nil | Do. |
| 11 | Dilauryl thiodipropionate | 0.25 | do | 0.25 | 550 | 270 | Nil | Do. |
| 12 | do | 0.5 | do | 0.5 | 815 | 430 | Nil | Do. |
| 12 | Dilauryl thiodiglycollate | 0.5 | do | 0.5 | 480 | 70 | Nil | Do. |
| 13 | Dilauryl thiodibutyrate | 0.5 | do | 0.5 | 1180 | 675 | Nil | Do. |
| 13 | N,N,dilauryl thiodipropionamide | 0.25 | do | 0.25 | 400 | 25 | Nil | Do. |

Samples 1/50 of an inch thick and 1½ inch long by ½ inch wide of the above mixtures of additives giving stabilised compositions in polypropylene were held for 24 hours, 10 cms. from a 500 watt high pressure mercury arc Hanovia S500 source of ultra violet light, screened by ½ mm. Pyrex cutting out light of less than 2850 A. and the degree of staining recorded qualitatively.

ABBREVIATIONS

In tables 1 to 3, the following abbreviations have been used:

3M6B—3-methyl-6-tertiary butyl phenol
3M6O—3-methyl-6-tertiary octyl phenol
2M6M—2,6-dimethyl phenol
2O4OMe—2-octyl-4-methoxy phenol

*Example II*

Isotactic polypropylene of melt flow index 5 (as measured by the A.S.T.M method modified by using a 10 kg. weight instead of the weight specified for causing extrusion) was mixed on open rolls at 165° C. with dilauryl β-thiodipropionate and a 3-methyl-6-tertiary butyl phenol/crotonaldehyde condensate, as set out in the following table.

Samples were pressed on to copper sheet of thickness .005" to give a coating of thickness .020".

Further samples were extruded on to copper wire of diameter .036" to give a coating of thickness .016".

These coated sheets and wires were held in an air oven at 140° C. until the coatings were found to be brittle when handled.

Comparative tests were performed on thin sheets about .020" thick prepared from the compositions by moulding at 190° C. and on copper sheets and wires coated with a composition containing an antioxidant prepared by condensing p-nonylphenol with acetone.

The results of these tests were as follows:

TABLE 3

| Expt. | 0.5% dilauryl thiodipropionate, 0.5% product of condensation of: | Period until brittle (hrs.) | | |
|---|---|---|---|---|
| | | Cu wire | Cu foil | No Cu |
| | No additives | <25 | <25 | <25 |
| 1 | 3M6B/butyraldehyde | 120 | 265 | 815 |
| 2 | 3M6B/crotonaldehyde | 240 | 500 | 930 |
| 3 | 3M6B/SCl₂ | 200 | 310 | 865 |
| | p-Nouyl phenol/acetone (for comparison) | 25 | 25 | 680 |

The coatings showed practically no staining when held for hours, 10 cms. from a 500 watt high pressure mercury arc Hanovia S500 source of ultra violet light, screened by ½ mm. Pyrex cutting out light of less than 2850 A.

Results from tests on different fractions are separated by an oblique stroke, the residue being given last.

We claim:
1. Articles comprising copper and a polymeric composition in contact therewith, said polymeric composition comprising isotactic polypropylene and a stabiliser composition comprising a diester of a thiodialkanoic acid selected from the class consisting of β-thiodipropionic and thiodibutyric acids and of an alcohol containing from ten to twenty carbon atoms, and a phenolic compound selected from compounds having the formula

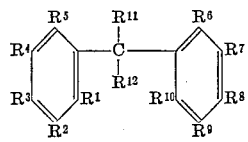

and compounds having the formula

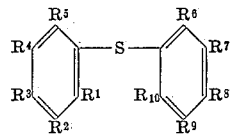

in which $R^3$ and $R^8$ are hydroxyl groups, and $R^2$ and $R^7$ are alkyl groups, the remaining nuclear substituents being selected from the class consisting of hydrocarbon groups, and hydrogen atoms, and in which $R^{11}$ and $R^{12}$ together contain at least three carbon atoms and are selected from the class consisting of alkyl groups, alkylated hydroxyaryl groups, hydrocarbon and oxacycloalkyl groups having as a substituent an alkylated hydroxyaryl group, and hydrogen atoms, the amount of said phenolic compound being up to 5% and the amount of said diester being such that there are from 1 to 10 hydroxyl groups provided to the composition by said phenolic compound for each sulfur atom provided to the composition by said diester.

2. Articles as set forth in claim 1 in which said phenolic compound is of the formula

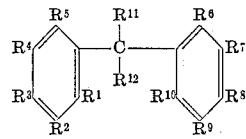

and is the condensate of at least two molecular proportions of 3-methyl-6-tertiarybutylphenol with one molecular proportion of crotonaldehyde, the amount of phenolic compound is up to 5% and there are from 1 to 10 hydroxyl groups provided to the composition by said phenolic compound to each sulfur atom provided by said diester.

3. Articles as set for the in claim 1 in which said phenolic compound is of the formula

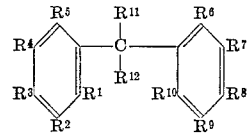

and is the condensate of at least two molecular proportions of 3-methyl-6-tertiarybutylphenol with one molecular proportion of cinnamaldehyde, the amount of phenolic compound is up to 5% and there are from 1 to 10 hydroxyl groups provided to the composition by said phenolic compound to each sulfur atom provided by said diester.

4. Articles as set forth in claim 1 in which said phenolic compound is of the formula

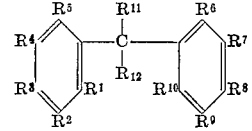

and is the condensate of at least two molecular proportions of 3-methyl-6-tertiaryoctyl phenol with one molecular proportion of crotonaldehyde, the amount of phenolic compound is up to 5% and there are from 1 to 10 hydroxyl groups provided to the composition by said phenolic compound to each sulfur atom provided by said diester.

5. Articles as set forth in claim 1 in which said phenolic compound is of the formula

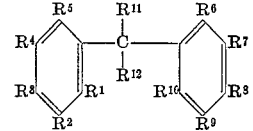

and is the condensate of at least two molecular proportions of 3-methyl-6-tertiaryoctylphenol with one molecular proportion of cinnamaldehyde, the amount of phenolic compound is up to 5% and there are from 1 to 10 hydroxyl groups provided to the composition by said phenolic compound to each sulfur atom provided by said diester.

6. Articles as set forth in claim 1 in which said phenolic compound is of the formula

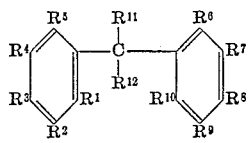

and is the condensate of two molecular proportions of 3-methyl-6-octylphenol with one molecular proportion of nonaldehyde, the amount of phenolic compound is up to 5% and there are from 1 to 10 hydroxyl groups provided to the composition by said phenolic compound to each sulfur atom provided by said diester.

7. Articles as set forth in claim 1 in which said phenolic compound is 4,4'-thiobis-3-methyl-6-tertiarybutylphenol, the amount of phenolic compound is up to 5% and there are from 1 to 10 hydroxyl groups provided to the composition by said phenolic compound to each sulfur atom provided by said diester.

8. Articles as set forth in claim 1 which said diester is dilauryl thiodipropionate, the amount of phenolic compound is up to 5% and there are from 1 to 10 hydroxyl groups provided to the composition by by said phenolic compound to each sulfur atom provided by said diester.

9. Articles as set forth in claim 1 in which said diester is diluaryl thiodibutyrate, the amount of phenolic compound is up to 5% and there are from 1 to 10 hydroxyl groups provided to the composition by said phenolic compound to each sulfur atom provided by said diester.

10. Articles as set forth in claim 1 in which said diester is distearyl thiodipropionate, the amount of phenolic compound is up to 5% and there are from 1 to 10 hydroxyl groups provided to the composition by said phenolic compound to each sulfur atom provided by said diester.

References Cited by the Examiner

UNITED STATES PATENTS

| | | | |
|---|---|---|---|
| 2,519,755 | 8/1950 | Gribbins | 260—45.85 |
| 2,669,507 | 2/1954 | Young | 260—45.85 |
| 2,825,721 | 3/1958 | Hogan et al. | 117—232 |
| 2,929,744 | 3/1960 | Mathes et al. | 117—232 |
| 2,956,982 | 10/1960 | McCall et al. | 260—45.85 |
| 2,966,476 | 12/1960 | Kralovec et al. | 260—45.95 |
| 2,970,151 | 1/1961 | Beaver et al. | 260—45.95 |
| 2,972,597 | 2/1961 | Newland et al. | 260—45.95 |
| 2,975,217 | 5/1961 | Spacht | 260—45.95 |
| 2,981,717 | 4/1961 | Boultbee | 260—45.85 |
| 2,984,645 | 5/1961 | Hoeschele | 260—45.95 |
| 2,985,617 | 5/1961 | Salyer et al. | 260—45.75 |
| 3,017,371 | 1/1962 | Hohenberg et al. | 117—232 |
| 3,033,814 | 5/1962 | Tholstrup | 260—45.85 |

FOREIGN PATENTS

| | | |
|---|---|---|
| 577,252 | 7/1959 | Belgium. |
| 587,296 | 5/1960 | Belgium. |
| 851,670 | 10/1960 | Great Britain. |
| 929,435 | 6/1963 | Great Britain. |

LEON J. BERCOVITZ, *Primary Examiner.*

MILTON STERMAN, DONALD E. CZAJA,
*Examiners.*

H. E. TAYLOR, G. W. RAUCHFUSS,
*Assistant Examiners.*